United States Patent
Jos et al.

(10) Patent No.: US 9,787,464 B2
(45) Date of Patent: Oct. 10, 2017

(54) METHOD AND APPARATUS FOR COMPENSATING FOR SAMPLING CLOCK-OFFSET

(71) Applicant: SAMSUNG ELECTRONICS CO., LTD., Suwon-si (KR)

(72) Inventors: Sujit Jos, Bangalore (IN); Kiran Bynam, Jalahalli (IN); Ashutosh Deepak Gore, Bangalore (IN); Chandrashekhar Thejaswi Ps, Bangalore (IN); Chang Soon Park, Chungju-si (KR); Young Jun Hong, Seoul (KR); Manoj Choudhary, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/172,487

(22) Filed: Jun. 3, 2016

(65) Prior Publication Data

US 2016/0359613 A1 Dec. 8, 2016

(30) Foreign Application Priority Data

Jun. 3, 2015 (IN) .......................... 2790/CHE/2015
Feb. 5, 2016 (KR) ...................... 10-2016-0015236

(51) Int. Cl.
*H04L 7/02* (2006.01)
*H04W 56/00* (2009.01)

(52) U.S. Cl.
CPC ............. *H04L 7/02* (2013.01); *H04W 56/001* (2013.01)

(58) Field of Classification Search
CPC ............................... H04L 7/02; H04W 56/001
See application file for complete search history.

(56) References Cited

U.S. PATENT DOCUMENTS

| | | |
|---|---|---|
| 7,009,931 B2 | 3/2006 | Ma et al. |
| 7,126,800 B2 | 10/2006 | Premerlani et al. |
| 7,623,583 B2 | 11/2009 | Wu |
| 7,633,997 B2 | 12/2009 | Lattard et al. |
| 8,416,676 B2 | 4/2013 | Wang et al. |
| 8,761,326 B2 | 6/2014 | Chen |
| 8,767,855 B2 | 7/2014 | Zhang et al. |
| 8,804,804 B1 | 8/2014 | Sarris |
| 2009/0015304 A1* | 1/2009 | Yin .......................... H03L 7/06 327/162 |
| 2010/0142078 A1 | 6/2010 | Annampedu et al. |
| 2014/0056583 A1 | 2/2014 | Giddings et al. |

FOREIGN PATENT DOCUMENTS

| | | |
|---|---|---|
| KR | 10-0666691 B1 | 1/2007 |
| KR | 10-1304849 B1 | 9/2013 |

* cited by examiner

*Primary Examiner* — Janice Tieu
(74) *Attorney, Agent, or Firm* — NSIP Law (57) ABSTRACT

A method for compensating for a sampling clock-offset includes calculating a positive threshold and a negative threshold of pulse-shaped data symbols to be received, calculating a positive sum ratio and a negative sum ratio from received samples, and compensating for a sampling clock-offset in response to the positive sum ratio being less than or equal to the positive threshold and the negative sum ratio being less than or equal to the negative threshold.

20 Claims, 11 Drawing Sheets

METHOD AND APPARATUS FOR COMPENSATING FOR SAMPLING CLOCK-OFFSET

CROSS-REFERENCE TO RELATED APPLICATIONS

This application claims the benefit under 35 USC 119(a) of Indian Patent Application No. 2790/CHE/2015 filed on Jun. 3, 2015 in the Indian Patent Office and Korean Patent Application No. 10-2016-0015236 filed on Feb. 5, 2016 in the Korean Intellectual Property Office, the entire disclosures of which are incorporated herein by reference for all purposes.

BACKGROUND

1. Field

The following description relates to a method for compensating for a sampling clock-offset in wireless communications. The following description also relates to an apparatus for compensating for a sampling clock-offset in wireless communications.

2. Description of Related Art

In a digital communication receiver, a mismatch between a desired sampling time and an actual sampling time may occur. Such a mismatch may occur due to a jitter that may occur in a clock feeding performed by an analog-to-digital converter (ADC), and such a mismatch may result in error samples in the demodulation of data symbols.

A sampling clock-offset may cause samples of a symbol to overlap a subsequent symbol or a previous symbol depending on a sign of a clock-offset. Thus, demodulation of a symbol may result in an erroneous decision about a demodulated symbol due to the presence of samples of adjacent symbols. During the demodulation of a symbol, a sampling clock-offset may be accumulated when a data length increases. Such a phenomenon may not be overcome simply by increasing a signal-to-noise ratio (SNR).

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of compensating for a sampling clock-offset by a digital communication receiver includes calculating a positive threshold and a negative threshold of pulse-shaped data symbols to be received, calculating a positive sum ratio and a negative sum ratio from received samples, and compensating for the sampling clock-offset in response to the positive sum ratio being less than or equal to the positive threshold and the negative sum ratio being less than or equal to the negative threshold.

The method may further include receiving samples in analog form and converting the received samples into digital form.

The positive threshold may be obtained from a ratio between a numerator positive term and a denominator positive term, and the negative threshold may be obtained from a ratio between a numerator negative term and a denominator negative term.

The numerator positive term may be obtained from a sum of elements of a positive sample vector, and the numerator negative term may obtained from a sum of elements of a negative sample vector, and the elements of the positive sample vector and the elements of the negative sample vector may include indices of a numerator positive set and a numerator negative set.

The numerator positive set and the numerator negative set may each be a subset of a range set.

The range set may be a set of all integers from 1 to an oversampling ratio (OSR)−1.

The positive sample vector may be obtained by collecting a number equal to an oversampling ratio (OSR) of equidistant samples from a symbol reception pulse having a first sample obtained at a start of the symbol reception pulse, and the negative sample vector may be obtained by collecting a number equal to the OSR of equidistant samples from the symbol reception pulse having a last sample obtained at an end of the symbol reception pulse.

The OSR may be found as a ratio between a symbol time duration and a sampling period.

The symbol reception pulse may be obtained by shifting a transmission pulse truncated by an advance time duration.

A distance between two adjacent samples of the positive sample vector and the negative sample vector may correspond to a sampling period.

The denominator positive term may be obtained from a sum of elements of a positive sample vector, and the denominator negative term may be obtained from a sum of elements of a negative sample vector, and the elements of the positive sample vector and the elements of the negative sample vector may be indices of a denominator positive set and a denominator negative set.

The denominator positive set may be a subset of a range set, and the denominator negative set may be a subset of the range set, and the denominator positive set may differ from a numerator positive set, and the denominator negative set may differ from a numerator negative set.

The compensating may include shifting a decision window leftwards by one sample in response to the negative sum ratio being less than or equal to the negative threshold.

The compensating may include shifting a decision window rightwards by one sample in response to the positive sum ratio being less than or equal to the positive threshold.

The method may further include compensating for a successive sampling clock-offset subsequent to receiving a predetermined number of samples, and the predetermined number of samples may be calculated based on a maximum fractional offset.

In another general aspect, a digital communication receiver includes one or more processors configured to calculate a positive threshold and a negative threshold of pulse-shaped data symbols to be received, calculate a positive sum ratio and a negative sum ratio from received samples, and compensate for a sampling clock-offset in response to the positive sum ratio being less than or equal to the positive threshold and the negative sum ratio being less than or equal to the negative threshold.

The digital communication receiver may further include a memory configured to store instructions to be executed by the one or more processors.

The positive threshold may be obtained from a ratio between a numerator positive term and a denominator positive term, and the negative threshold may be obtained from a ratio between a numerator negative term and a denominator negative term.

The numerator positive term may be obtained from a sum of elements of a positive sample vector, the numerator negative term may be obtained from a sum of elements of a negative sample vector, and the elements of the positive sample vector and the elements of the negative sample vector may include indices of a numerator positive set and a numerator negative set.

The denominator positive term may be obtained from a sum of elements of a positive sample vector, the denominator negative term may be obtained from a sum of elements of a negative sample vector, and the elements of the positive sample vector and the elements of the negative sample vector may be indices of a denominator positive set and a denominator negative set.

The compensating may include shifting a decision window leftwards by one sample in response to the negative sum ratio being less than or equal to the negative threshold.

The compensating may include shifting a decision window rightwards by one sample in response to the positive sum ratio being less than or equal to the positive threshold.

The one or more processors may be further configured to perform a further operation of compensating for a successive sampling clock-offset subsequent to receiving a predetermined number of samples, and the predetermined number of samples may be calculated based on a maximum fractional offset.

In another general aspect, a computer program is embodied on a non-transitory computer readable medium, the computer program being configured to control a processor to perform the method described above.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

The terminology used herein is for the purpose of describing particular examples only and is not to be limiting of the examples. As used herein, the singular forms "a," "an," and "the" are intended to include the plural forms as well, unless the context clearly indicates otherwise. It is to be further understood that the terms "include/comprise" and/or "have," when used in this specification, specify the presence of stated features, integers, steps, operations, elements, components, and/or combinations thereof, but do not preclude the presence or addition of one or more other features, numbers, steps, operations, elements, components, and/or groups of such additional aspects.

In addition, terms such as first, second, A, B, (a), (b), and the like are potentially used herein to describe components. Each of these terminologies is not used to define an essence, order or sequence of a corresponding component but used merely to distinguish the corresponding component from other component(s), for identification purposes.

It is to be noted that if it is described in the specification that one component is "connected," "coupled," or "joined" to another component, a third component may be "connected," "coupled," and "joined" between the first and second components, although alternatively the first component may be directly connected, coupled or joined to the second component.

Unless otherwise defined, all terms including technical and scientific terms used herein have the same meaning as commonly understood by one of ordinary skill in the art to which examples belong. It is to be further understood that terms, such as those defined in commonly-used dictionaries, are to be interpreted as having a meaning that is consistent with their meaning in the context of the relevant art and are not to be interpreted in an idealized or overly formal sense unless expressly so defined herein.

Examples that are to be described subsequently are applicable to arithmetically identify a movement of an object included in a moving image, and also to determine a type of the movement.

Hereinafter, examples are described in detail with reference to the accompanying drawings. When describing the examples with reference to the accompanying drawings, like reference numerals refer to like constituent elements and a repeated description related thereto is omitted for brevity.

Figure 1:
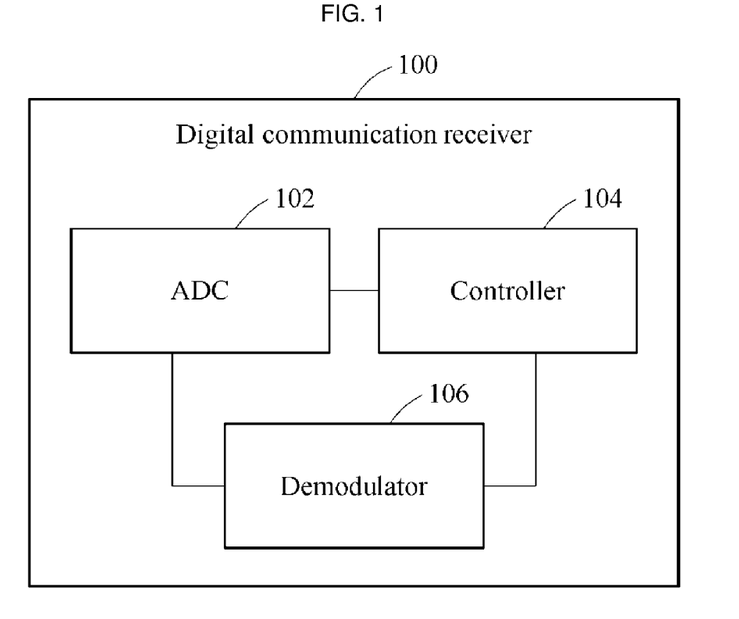
FIG. 1 is a diagram illustrating an example of a digital communication receiver to compensate for a sampling clock-offset.

FIG. 1 is a diagram illustrating an example of a digital communication receiver 100 to compensate for a sampling clock-offset.

A method of compensating for a sampling clock-offset, hereinafter simply referred to as a sampling clock-offset compensating method, compensates for a sampling clock-offset and is performed by the digital communication receiver 100. Dissimilar to conventional systems, the sampling clock-offset compensating method disclosed herein avoids correlation-based techniques and provides a low-complexity mechanism. Thus, the sampling clock-offset compensating method disclosed herein reduces significantly an amount of time used for computations or calculations when performing a sampling clock-offset compensating method.

Referring to the example of FIG. 1, the digital communication receiver 100 includes an analog-to-digital converter (ADC) 102, a controller 104, and a demodulator 106. However, these are only example components of the digital communication receiver 100, and in other examples additional components are optionally present as well.

In such an example, a positive threshold and a negative threshold of pulse-shaped data symbols is calculated. For example, the positive threshold is obtained as a ratio between a numerator positive term and a denominator positive term. Such a numerator positive term is a sum of elements of a positive sample vector, and the elements include indices of a numerator positive set. In such an example, the numerator positive set is a subset of a range set. Such a range set refers to a set of all integers from 1 to an oversampling ratio (OSR)−1. In this example, an OSR refers to a ratio of a symbol time duration to a sampling period.

For example, the positive sample vector is obtained by collecting a number correspond to the OSR of equidistant samples from a symbol reception pulse having a first sample that was obtained at a start of the symbol reception pulse. In such an example, a distance between two adjacent samples of the positive sample vector is referred to as the sampling period. For example, the symbol reception pulse is obtained by shifting a transmission pulse that is truncated by an advance time duration. The truncated transmission pulse is obtained by truncating an end of a transmission pulse so that a time duration of the truncated transmission pulse is identical to the symbol time duration and so that a center of the transmission pulse corresponds to a peak of the transmission pulse. The advance time duration is obtained by subtracting a half of the symbol time duration from a point in time corresponding to the peak of the transmission pulse. In such an example, a denominator positive set is a subset of the range set, and differs from the numerator positive set.

In an example, the negative threshold is obtained as a ratio between a numerator negative term and a denominator negative term. The numerator negative term is a sum of elements of a negative sample vector, and the elements include indices of a numerator negative set. For example, the numerator negative set is a subset of the range set. The negative sample vector is obtained by collecting a number corresponding to the OSR of equidistant samples from the symbol reception pulse, having a last sample obtained at an end of the symbol reception pulse. The denominator negative term is a sum of elements of the negative sample vector. Such elements include indices of a denominator negative set. In an example, the denominator negative set is a subset of the range set, and differs from the numerator negative set.

In the example of FIG. 1, the ADC 102 receives the pulse-shaped data symbols. Each symbol of the pulse-shaped data symbols includes a plurality of samples, for example, signals. Such samples correspond to symbols that are being transmitted. The ADC 102 converts the received samples from an analog form to a digital form. Also, the ADC 102 transmits the samples obtained through the converting, that are in digital form after the conversion, to the controller 104.

In an example, the controller 104 calculates a positive sum ratio and a negative sum ratio of the received samples. For example, the controller 104 calculates the positive sum ratio as a ratio between the numerator positive term and the denominator positive term, after obtaining the positive sample vector and the negative sample vector by collecting a number corresponding to the OSR of successive samples. The controller 104 calculates the negative sum ratio as a ratio between the numerator negative term and the denominator negative term.

In response to the positive sum ratio being less than or equal to the positive threshold and the negative sum ratio being less than or equal to the negative threshold, the controller 104 compensates for a sampling clock-offset. For example, in response to the positive sum ratio being less than or equal to the positive threshold, the compensating is performed by shifting a decision window rightwards by one sample. Alternatively, in response to the negative sum ratio being less than or equal to the negative threshold, the compensating is performed by shifting the decision window leftwards by one sample.

In the example of FIG. 1, the demodulator 106 demodulates samples received from the controller 104 that have been processed as discussed above.

In addition, the controller 104 compensates for a successive sampling clock-offset subsequent to a predetermined number of samples, for example, represented by num_samples. Here, the predetermined number of samples, represented by num_samples, is calculated based on a maximum fractional offset. For example, an initial compensation is applied subsequent to all the num_samples. Here, the num_samples is a sum of 1 and an offset term. In such an example, the offset term is obtained based on a ratio between 1 and the maximum fractional offset. Thus, the calculation of num_samples is represented by Equation 1 below.

$$\text{num\_samples} = (1 + 1/\epsilon) \qquad \text{Equation 1}$$

Although FIG. 1 illustrates an example of the digital communication receiver 100, the digital communication receiver 100 is not limited to the illustrated example. As noted above, the digital communication receiver 100 may include other elements, such as other hardware elements used for communicating with the digital communication receiver 100.

Figure 2:
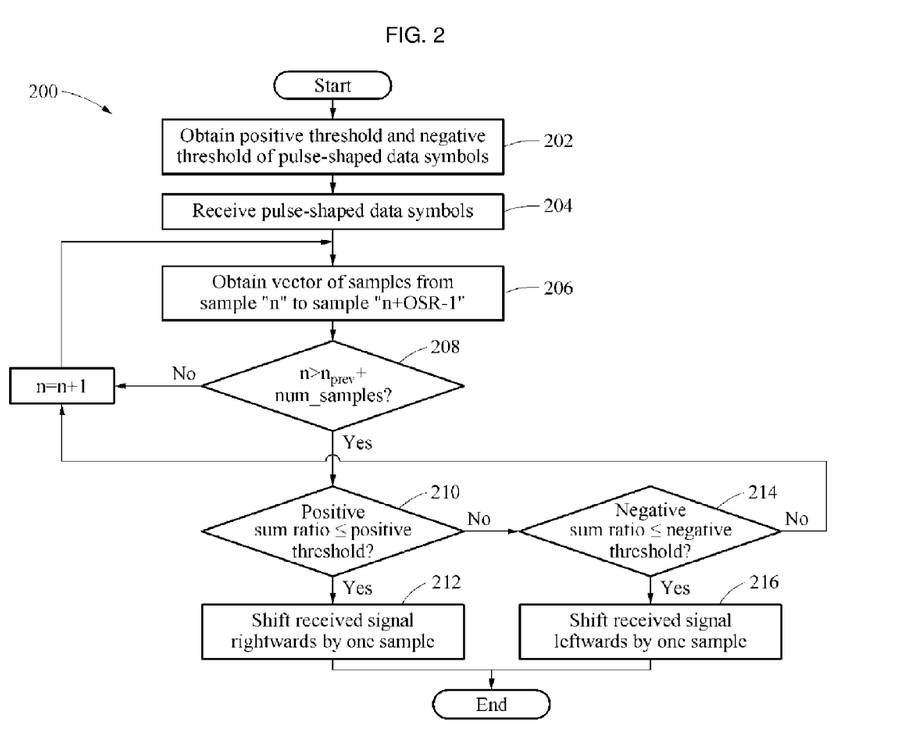
FIG. 2 is a flowchart illustrating an example of a method of compensating for a sampling clock-offset by a digital communication receiver.

FIG. 2 is a flowchart illustrating an example of a sampling clock-offset compensating method to be performed by a digital communication receiver.

In the example of FIG. 2, a sampling clock-offset compensating method 200 that is to be performed by the digital communication receiver 100 of the example of FIG. 1 is illustrated.

Referring to the example of FIG. 2, in operation 202 of the method 200, the method calculates a positive threshold and a negative threshold. For example, the digital communication receiver 100 calculates a positive threshold and a negative threshold. In an example, the controller 104 of FIG. 1 calculates the positive threshold and the negative threshold.

Under the assumption that a symmetrical pulse shape P(t) has a peak at a time $t_m$, a truncated pulse $P_t(t)$ is defined using Equation 2 below.

$$p_t(t) = \begin{cases} p(t) & \text{for } t_m - \dfrac{T_b}{2} < t < t_m + \dfrac{T_b}{2} \\ 0 & \text{otherwise} \end{cases} \qquad \text{Equation 2}$$

Further, a waveform $P_s(t)$ is defined using Equation 3 below.

$$p_s(t) = p_t\left(t + t_m - \frac{T_b}{2}\right) \quad \text{Equation 3}$$

Furthermore, if the pulse $P_s(t)$ is sampled to have a period of $T_s=1/f_s$, an OSR may be found as $T_b/T_s$. Accordingly, the positive threshold and the negative threshold are defined using Equation 4, below, where the positive threshold corresponds to $\text{Threshold}_{plus}$ and the negative threshold corresponds to $\text{Threshold}_{negative}$.

$$\text{Threshold}_{plus} = \frac{\sum_{n \in N_p} S_n^p}{\sum_{k \in D_p} S_k^p} \quad \text{Equation 4}$$

$$\text{Threshold}_{negative} = \frac{\sum_{n \in N_m} S_n^p}{\sum_{k \in D_m} S_k^p}$$

In the example of Equation 4, $S_n^p = P_s(nT_s)$, where n is defined such that n=1, ... OSR, is referred to as a positive sample vector. For example, such a positive sample vector is obtained by positioning a first sample of $S_n^p$ at a start of $P_s(t)$ as illustrated in FIG. 5B. In such an example, the positive threshold when, for example, OSR=4, is obtained as $$\frac{S_3 + S_4}{S_1 + S_2}.$$

Figure 5A:
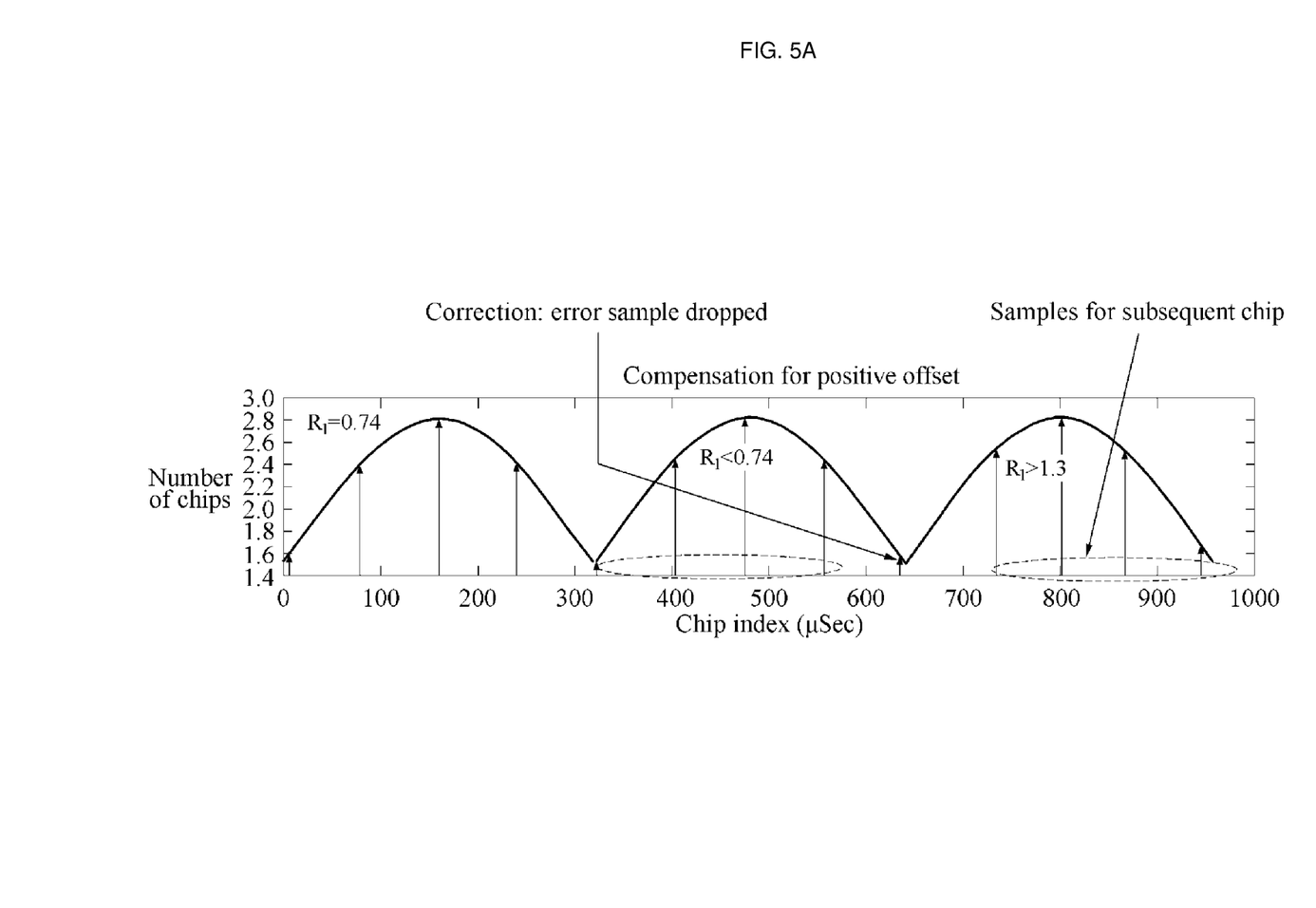
FIG. 5A is a diagram illustrating an example of a waveform showing a compensation for an error sample in a case of a positive clock-offset having an oversampling ratio (OSR) of 4.
Figure 5B:
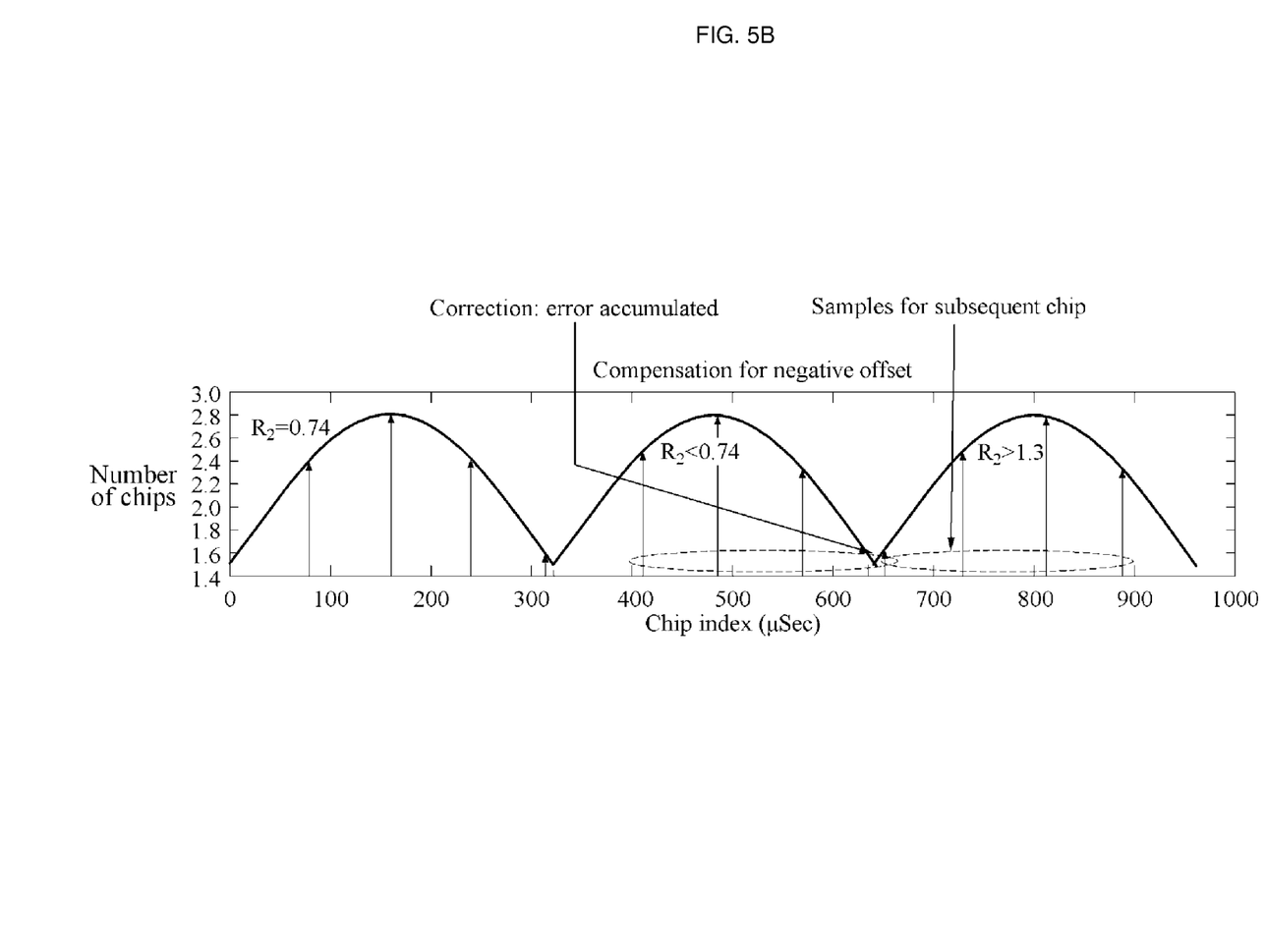
FIG. 5B is a diagram illustrating an example of a waveform showing a compensation for an error sample in a case of a negative clock-offset having an OSR of 4.
Figure 6:
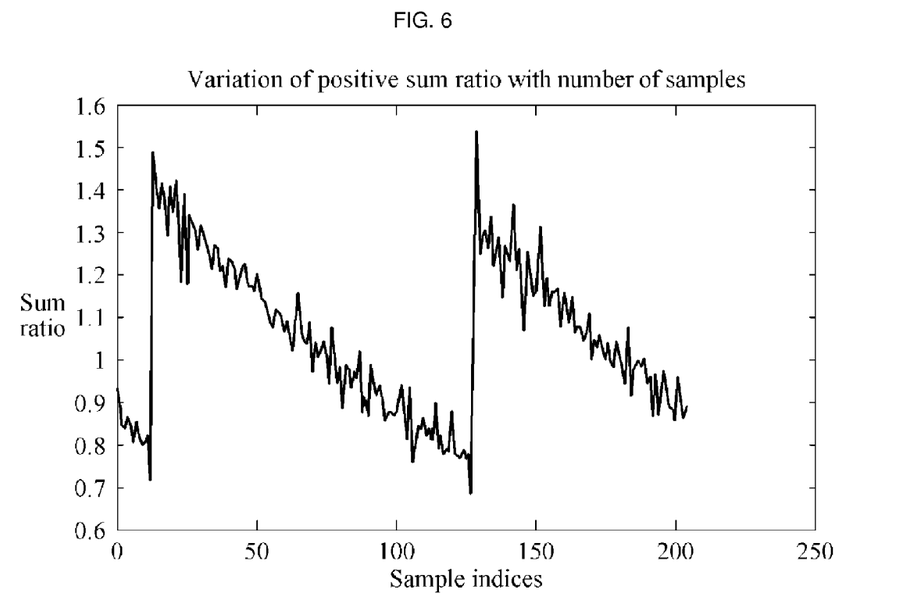
FIG. 6 is a diagram illustrating an example of a waveform showing a variation of a positive sum ratio having the number of samples.
Figure 7:
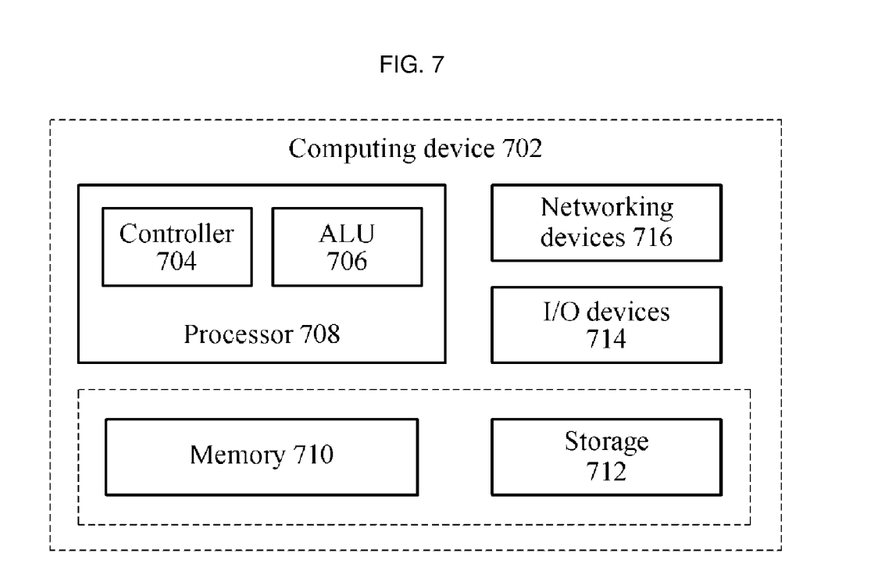
FIG. 7 is a diagram illustrating an example of a computing device for implementing a method of compensating for a sampling clock-offset.

For example, the same parameters are applied for the examples of FIGS. 5B, 6, and 7. In addition, a set $N_p$ is a numerator positive set including indices of elements of $S_n^p$, which may be included in a summation in a numerator of the positive threshold. A set $D_p$ is a denominator positive set including the indices of the elements of $S_n^p$, which may be included in a summation in a denominator of the positive threshold. Similarly, for the negative threshold, $S_n^m = P_s(nT_s)$, where n is defined such that n=1, ... OSR, and is referred to as a negative sample vector that is obtained by positioning a last sample of $S_n^m$ at an end of $P_s(t)$ as illustrated in the example of FIG. 5C. For example, a set $N_m$ is a numerator negative set that includes indices of elements of $S_n^m$, which may be included in a summation in a numerator of the negative threshold. A set $D_m$ is a denominator negative set that includes the indices of the elements of $S_n^m$, which may be included in a summation in a denominator of the negative threshold. In these examples, there is a condition that the numerator positive set $N_p$ is different from the denominator positive set $D_p$, and the numerator negative set $N_m$ is different from the denominator negative set $D_m$. Therefore, the sets satisfy the relations that, $N_p \neq D_p$ and $N_m \neq D_m$. In an example, a size of the sets $N_p$, $D_p$, $N_m$, and $D_m$ is set as any value from a set $\{1, 2, 3 \ldots, \text{OSR}-1\}$. For example, under the assumption that an OSR is 4, and $N_p = D_m = \{1, 2\}$ and $N_m = D_p = \{3,4\}$, the positive threshold and the negative threshold are then determined by Equation 5 below.

$$\text{Threshold positive} = \frac{S_1 + S_2}{S_3 + S_4} \quad \text{Equation 5}$$

$$\text{Threshold negative} = \frac{S_3 + S_4}{S_1 + S_2}$$

In operation 204 of the method 200, the method receives pulse-shaped data symbols. For example, the digital communication receiver 100 receives pulse-shaped data symbols. In such an example, each of the received pulse-shaped data symbols includes a plurality of samples. The digital communication receiver 100 receives the pulse-shaped data symbols, and each symbol includes the plurality of samples.

In operation 206 of the method 200, the method obtains a vector including samples from a sample n to a sample n+OSR−1. For example, the digital communication receiver 100 obtains a vector including samples from a sample n to a sample n+OSR−1. In an example, the controller 104 obtains the vector including the samples from the sample n to the sample n+OSR−1.

In operation 208 of the method 200, the method determines whether the sample n is greater than a previous sample $n_{prev}$+the number of samples num_samples. For example, the digital communication receiver 100 determines whether the sample n is greater than a previous sample $n_{prev}$+the number of samples num_samples. When the sample n is determined to be greater than a value of $n_{prev}$+num_samples, operation 210 of the method 200 uses the positive threshold. In operation 212 of the method 200, when the positive sum ratio is determined to be less than or equal to the positive threshold in operation 210, the method shifts a received signal rightwards by one sample. For example, the digital communication receiver 100 shifts a received signal rightwards by one sample.

In operation 214 of the method 200, when the positive sum ratio is determined not to be less than or equal to the positive threshold, the method determines whether a negative sum ratio is less than or equal to the negative threshold. For example, the digital communication receiver 100 determines whether a negative sum ratio is less than or equal to the negative threshold. In operation 216 of the method 200, when the negative sum ratio is determined to be less than or equal to the negative threshold in operation 214, the method shifts the received signal leftwards by one sample. For example, the digital communication receiver 100 shifts the received signal leftwards by one sample. When the negative sum ratio is determined not to be less than or equal to the negative threshold in operation 214, the method increases the sample n by 1 (i.e., n=n+1) and operation 206 is performed as described in the foregoing. For example, the digital communication receiver 100 increases the sample n by 1 (i.e., n=n+1) and operation 206 is performed as described in the foregoing.

When the sample n is determined not to be greater than the value of $n_{prev}$+num_samples in operation 208, the method increases the sample n by 1 and operation 206 is performed as described in the foregoing. For example, the digital communication receiver 100 increases the sample n by 1 and operation 206 is performed as described in the foregoing.

In an example, the positive sum ratio and the negative sum ratio are determined by using Equation 6 below.

$$\text{Sum Ratio plus} = \frac{\sum_{n \in N_p} r_n^l}{\sum_{k \in D_p} r_k^l}$$ Equation 6

$$\text{Sum Ratio minus} = \frac{\sum_{n \in N_m} r_n^l}{\sum_{k \in D_m} r_k^l}$$

$$\rho_1 + \rho_2$$

In Equation 6, $r_u = r_1^i, r_2^i, \ldots, r_{OSR}^i$ is a received vector corresponding to a received symbol $I^{th}$.

In this example, the positive sum ratio corresponds to a positive offset, and the negative sum ratio corresponds to a negative offset. For example, sample locations for calculating the positive sum ratio and the negative sum ratio may be the same as in the case of the positive threshold and the negative threshold. When the positive sum ratio is less than or equal to the positive threshold or the negative sum ratio is less than or equal to the negative threshold, the presence of an additional error sample is determined.

In an example corresponding to the positive offset, a sampling clock-offset is compensated for by shifting a sample collection window rightwards by one sample. In an example corresponding to the negative offset, a sampling clock-offset is compensated for by shifting the sample collection window leftwards by one sample. Furthermore, the method 200 includes compensation for a sampling clock-offset only after receiving the num_samples of the sample after each correction. This approach is used because an amount of time $T_s$ is used until an error sample drifts into a genuine symbol after a correction. In an example, the number of samples required for the drifting is $1+1/\epsilon$.

Figure 3A:
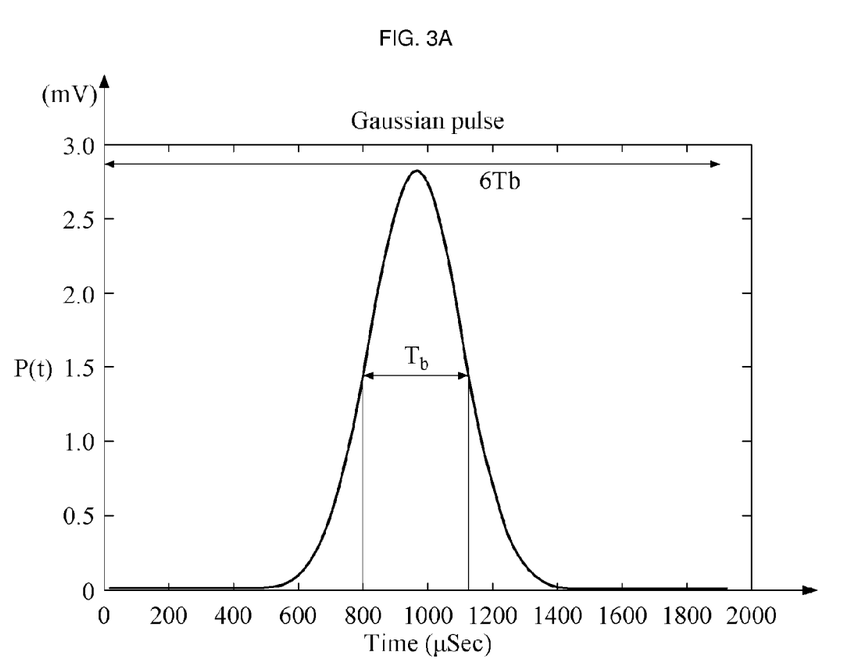
FIGS. 3A and 3B are diagrams illustrating examples of a Gaussian pulse waveform applied to a digital communication receiver.
Figure 3B:
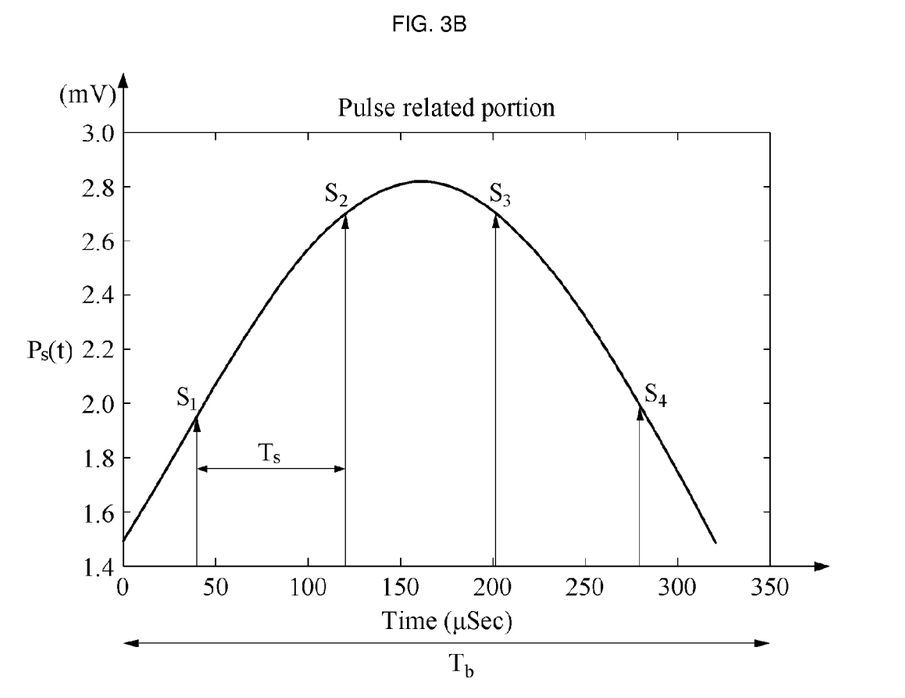

FIGS. 3A and 3B are diagrams illustrating examples of a Gaussian pulse waveform applied to a digital communication receiver.

In an example of an impulse response of a Gaussian filter having a BT product of 0.3, wherein B denotes a bandwidth and T denotes a time duration, an inter-symbol interference (ISI) spans six symbols as illustrated in the example of FIG. 3A.

Further, as illustrated in the example FIG. 3B, a portion of the Gaussian pulse in the digital communication receiver is sampled to make a decision on transmitted symbols.

Figure 4A:
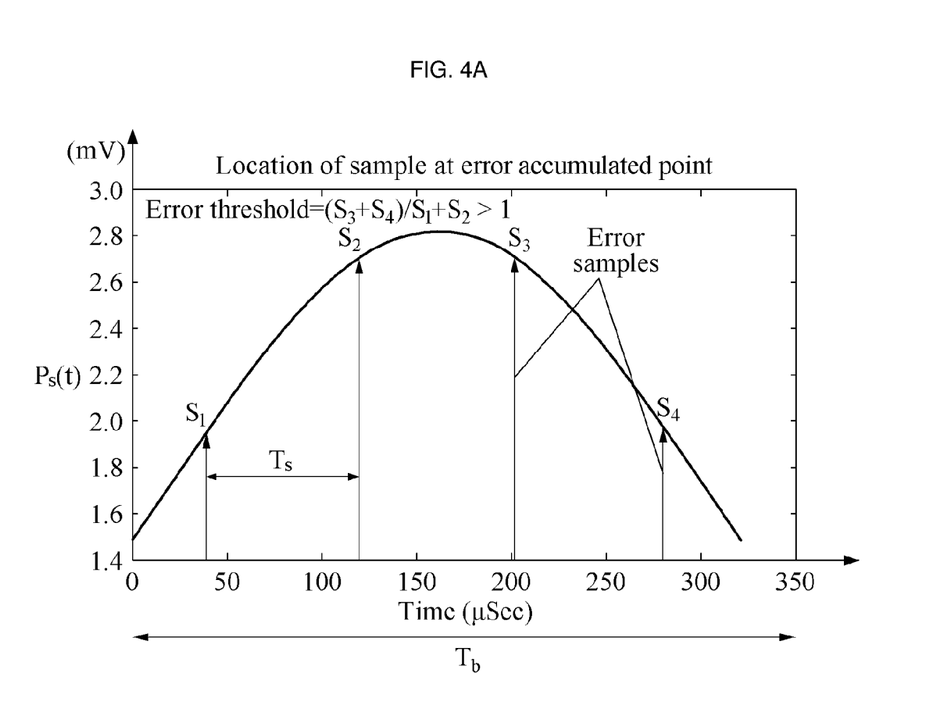
FIGS. 4A, 4B, and 4C are diagrams illustrating examples of locations of samples for an error demodulation.
Figure 4B:
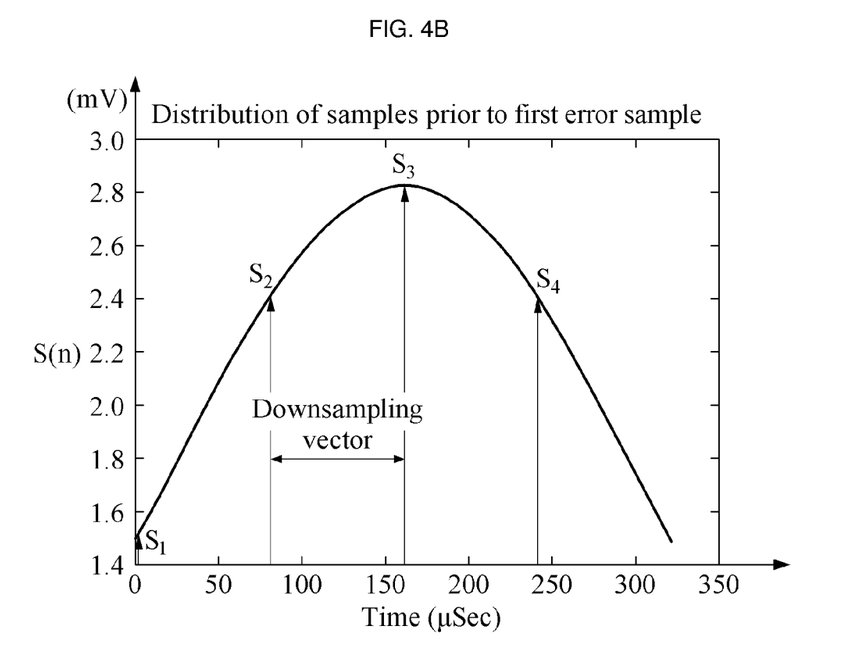
Figure 4C:
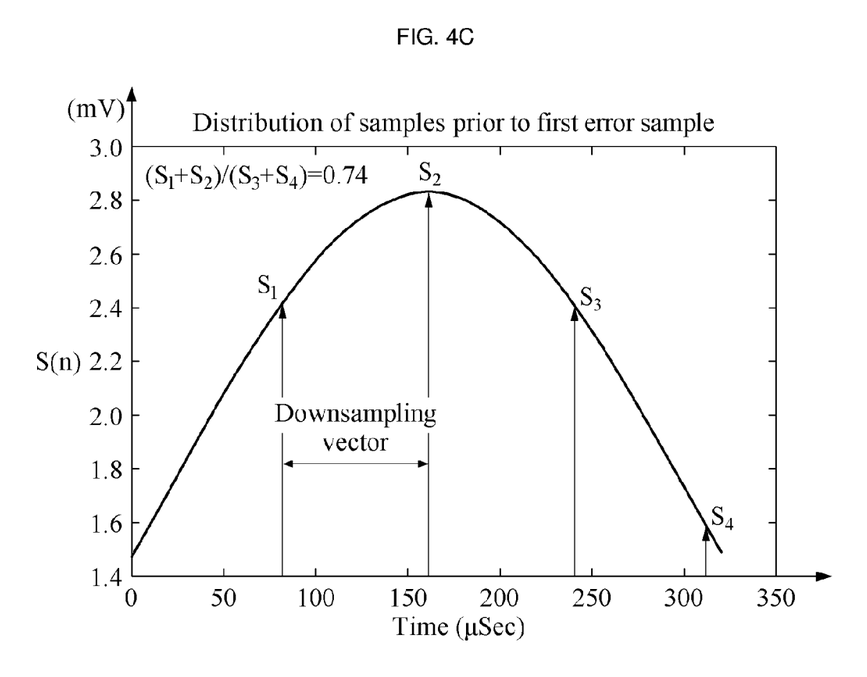

FIGS. 4A, 4B, and 4C are diagrams illustrating examples of locations of samples for an error demodulation.

FIG. 4A illustrates locations of samples obtained immediately before an error demodulation in the absence of noise. Referring to FIG. 4A, a first sample S1 and a second sample S2 correspond to genuine samples, and a third sample S3 and a last sample S4 correspond to error samples. In symbols corresponding to subsequent symbols, the error samples, for example, S3 and S4, possibly become larger in magnitude, which may lead to an erroneous demodulation of the subsequent symbols in the absence of noise.

In addition, in an example, in the presence of noise, a demodulation performance affects the presence of a single error sample depending on a strength of a sample and a signal-to-noise ratio (SNR) of an operation. Also, it is possible to arithmetically identify a point in time at which the error sample appears during a demodulation process. When a sample crosses a symbol boundary or falls from a pulse in response to a previous symbol or a subsequent symbol based on whether an offset is positive or negative, a genuine sample in a symbol then becomes an error sample.

As illustrated in the example of FIG. 4B, for a positive clock-offset, the first sample S1 becomes an error sample in subsequent symbols. A magnitude of each sample depends on a shape of a pulse and an OSR. As illustrated in the example of FIG. 4C, for a negative clock-offset, the last sample S4 becomes an error sample in the subsequent symbols. Further, in the examples of FIGS. 4B and 4C, a positive threshold of (S1+S2)/(S3+S4) and a negative threshold of (S3+S4)/(S1+S2) have a value that is equal to 0.74.

FIG. 5A is a diagram illustrating an example of a waveform showing a compensation for an error sample in an example of a positive clock-offset having an OSR of 4.

FIG. 5A illustrates a waveform showing a compensation for an error sample in an example of a positive clock-offset having an OSR of 4, and the positive threshold and the negative threshold as described above. For example, the sample S2 of a previous symbol is the sample S1 of a current symbol.

FIG. 5B is a diagram illustrating an example of a waveform showing a compensation for an error sample in an example of a negative clock-offset having an OSR of 4.

FIG. 5B illustrates a waveform showing a compensation for an error sample in an example of a negative clock-offset having an OSR of 4. In the example of the negative clock-offset as illustrated in FIG. 5B, the error sample is included in a current symbol. For example, a magnitude of the sample S1 of a previous symbol corresponds to that of the sample S2 of the current symbol.

FIG. 6 is a diagram illustrating an example of a waveform showing a variation of a positive sum ratio with respect to the number of samples.

As illustrated in the example of FIG. 6, a compensation operation for a sampling clock-offset is applied when a positive sum ratio falls below 0.74. Further, the positive sum ratio then changes from approximately 0.74 to approximately 1.33, such that the variation becomes gradual with averaging.

FIG. 7 is a diagram illustrating an example of a computing device 702 used for implementing a sampling clock-offset compensating method, as described further above.

Referring to FIG. 7, the computing device 702 used for implementing the sampling clock-offset compensating method includes at least one processor 708 including a controller 704 and an arithmetic logic unit (ALU) 706, a memory 710, a storage 712, a plurality of networking devices 716, and a plurality of input and output (I/O) devices 714. The processor 708 processes an instruction of an algorithm. The processor 708 performs at least one operation described further with reference to FIGS. 1 through 6. In an example, the processor 708 receives a command or instruction from the controller 704 and processes the received command or instruction. In addition, a logical operation and an arithmetic operation involved in execution of the instruction or command may be performed using the ALU 706.

In various examples, the computing device 702 may include multiple homogeneous and/or heterogeneous cores, multiple central processing units (CPUs) of different types, special media and other accelerators. For example, the processor 708 processes the instructions or operations included in an algorithm corresponding to the method. Further, in other examples, a plurality of processors may be located on a single chip or over multiple chips.

The algorithm including instructions and operations used for the implementation of the method may be stored in either the memory 710 or the storage 712 or both. For example, the memory 710 stores instructions for performing at least one operation described with reference to FIGS. 1 through 6, or stores data or results obtained during an operation of the computing device 702. During the operations, the instructions and commands are fetched from the memory 710 or the storage 712, and then executed by the processor 708.

In an example using a hardware implementation, the networking devices 716 or the external I/O devices 714 are connected to the computing device 702 to support the implementation through using the networking devices 716 and the I/O devices 714.

The apparatuses, units, modules, devices, and other components illustrated in FIGS. 1-7 that perform the operations described herein with respect to FIGS. 1-7 are implemented by hardware components. Examples of hardware components include controllers, sensors, generators, drivers, memories, comparators, arithmetic logic units, adders, subtractors, multipliers, dividers, integrators, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-7. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-7 that perform the operations described herein with respect to FIGS. 1-7 are performed by computing hardware, for example, by one or more processors or computers, as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of compensating for a sampling clock-offset by a digital communication receiver, comprising:
    calculating a positive threshold and a negative threshold of pulse-shaped data symbols to be received;
    calculating a positive sum ratio and a negative sum ratio from received samples; and
    compensating for the sampling clock-offset, in the digital communication receiver, in response to the positive sum ratio being less than or equal to the positive threshold and the negative sum ratio being less than or equal to the negative threshold.

2. The method of claim 1, wherein the positive threshold is obtained from a ratio between a numerator positive term and a denominator positive term, and the negative threshold is obtained from a ratio between a numerator negative term and a denominator negative term.

3. The method of claim 2, wherein the numerator positive term is obtained from a sum of elements of a positive sample vector, the numerator negative term is obtained from a sum of elements of a negative sample vector, and the elements of the positive sample vector and the elements of the negative sample vector comprise indices of a numerator positive set and a numerator negative set.

4. The method of claim 3, wherein the numerator positive set and the numerator negative set are each a subset of a range set.

5. The method of claim 3, wherein the positive sample vector is obtained by collecting a number equal to an oversampling ratio (OSR) of equidistant samples from a symbol reception pulse having a first sample obtained at a start of the symbol reception pulse, and the negative sample vector is obtained by collecting a number equal to the OSR of equidistant samples from the symbol reception pulse having a last sample obtained at an end of the symbol reception pulse.

6. The method of claim 5, wherein the symbol reception pulse is obtained by shifting a transmission pulse truncated by an advance time duration.

7. The method of claim 5, wherein a distance between two adjacent samples of the positive sample vector and the negative sample vector corresponds to a sampling period.

8. The method of claim 2, wherein the denominator positive term is obtained from a sum of elements of a positive sample vector, the denominator negative term is obtained from a sum of elements of a negative sample vector, and the elements of the positive sample vector and the elements of the negative sample vector are indices of a denominator positive set and a denominator negative set.

9. The method of claim 8, wherein the denominator positive set is a subset of a range set, the denominator negative set is a subset of the range set, the denominator positive set differs from a numerator positive set, and the denominator negative set differs from a numerator negative set.

10. The method of claim 1, wherein the compensating comprises:

shifting a decision window leftwards by one sample in response to the negative sum ratio being less than or equal to the negative threshold.

11. The method of claim 1, wherein the compensating comprises:

shifting a decision window rightwards by one sample in response to the positive sum ratio being less than or equal to the positive threshold.

12. The method of claim 1, further comprising:

compensating for a successive sampling clock-offset subsequent to receiving a predetermined number of samples, wherein the predetermined number of samples is calculated based on a maximum fractional offset.

13. A digital communication receiver, comprising:

one or more processors configured to calculate a positive threshold and a negative threshold of pulse-shaped data symbols to be received, calculate a positive sum ratio and a negative sum ratio from received samples, and compensate for a sampling clock-offset, in the digital communication receiver, in response to the positive sum ratio being less than or equal to the positive threshold and the negative sum ratio being less than or equal to the negative threshold.

14. The digital communication receiver of claim 13, wherein the positive threshold is obtained from a ratio between a numerator positive term and a denominator positive term, and the negative threshold is obtained from a ratio between a numerator negative term and a denominator negative term.

15. The digital communication receiver of claim 14, wherein the numerator positive term is obtained from a sum of elements of a positive sample vector, the numerator negative term is obtained from a sum of elements of a negative sample vector, and the elements of the positive sample vector and the elements of the negative sample vector comprise indices of a numerator positive set and a numerator negative set.

16. The digital communication receiver of claim 14, wherein the denominator positive term is obtained from a sum of elements of a positive sample vector, the denominator negative term is obtained from a sum of elements of a negative sample vector, and the elements of the positive sample vector and the elements of the negative sample vector are indices of a denominator positive set and a denominator negative set.

17. The digital communication receiver of claim 13, wherein the compensating comprises:

shifting a decision window leftwards by one sample in response to the negative sum ratio being less than or equal to the negative threshold.

18. The digital communication receiver of claim 13, wherein the compensating comprises:

shifting a decision window rightwards by one sample in response to the positive sum ratio being less than or equal to the positive threshold.

19. The digital communication receiver of claim 13, wherein the one or more processors are further configured to perform a further operation of compensating for a successive sampling clock-offset subsequent to receiving a predetermined number of samples, and the predetermined number of samples is calculated based on a maximum fractional offset.

20. A computer program embodied on a non-transitory computer readable medium, the computer program being configured to control a processor to perform the method of:

calculating a positive threshold and a negative threshold of pulse-shaped data symbols to be received;

calculating a positive sum ratio and a negative sum ratio from received samples; and compensating for the sampling clock-offset, in the digital communication receiver, in response to the positive sum ratio being less than or equal to the positive threshold and the negative sum ratio being less than or equal to the negative threshold.

* * * * *